(12) United States Patent
Auranen

(10) Patent No.: US 7,887,617 B2
(45) Date of Patent: Feb. 15, 2011

(54) METHOD AND APPARATUS FOR ORE PROCESSING

(75) Inventor: Iipo Auranen, Espoo (FI)

(73) Assignee: Mine On-Line Service Oy, Espoo (FI)

( * ) Notice: Subject to any disclaimer, the term of this patent is extended or adjusted under 35 U.S.C. 154(b) by 250 days.

(21) Appl. No.: 11/922,086

(22) PCT Filed: Jun. 2, 2006

(86) PCT No.: PCT/FI2006/050229

§ 371 (c)(1),
(2), (4) Date: Dec. 13, 2007

(87) PCT Pub. No.: WO2006/134223

PCT Pub. Date: Dec. 21, 2006

(65) Prior Publication Data

US 2009/0031857 A1    Feb. 5, 2009

(30) Foreign Application Priority Data

Jun. 15, 2005    (FI)    ................................. 20050633

(51) Int. Cl.
C22B 3/02    (2006.01)
C22B 3/04    (2006.01)

(52) U.S. Cl. .................. 75/10.12; 75/10.13; 75/384; 75/743; 266/80; 266/81; 266/86; 266/92; 266/101

(58) Field of Classification Search .............. 75/743, 75/375, 384, 10.12, 10.13; 266/80, 81, 92, 266/101, 86

See application file for complete search history.

(56) References Cited

U.S. PATENT DOCUMENTS

| | | | |
|---|---|---|---|
| 3,567,929 A | | 3/1971 | White et al. |
| 4,441,616 A | | 4/1984 | Konig et al. |
| 5,527,382 A | * | 6/1996 | Alvarez et al. ................. 75/712 |
| 6,383,553 B1 | | 5/2002 | Tondar et al. |
| 7,575,622 B2 | * | 8/2009 | Crundwell et al. ............ 75/380 |
| 2006/0159614 A1 | | 7/2006 | Apelqvist et al. |
| 2007/0186724 A1 | * | 8/2007 | Seal ............................. 75/711 |

FOREIGN PATENT DOCUMENTS

| | | |
|---|---|---|
| BE | 695627 A | 9/1967 |
| FR | 2 690 745 A1 | 11/1993 |
| JP | A 57-63439 | 4/1982 |
| JP | 06127663 A * | 5/1994 |
| JP | A 2003-45793 | 12/2000 |

OTHER PUBLICATIONS

Machine translation of JP 06-127663A publshed May 1994.*
Derwent Acc No. 1986-284081 for SU 1221560 A puslished Mar. 30, 1986.*

* cited by examiner

*Primary Examiner*—George Wyszomierski
*Assistant Examiner*—Tima M McGuthry-Banks
(74) *Attorney, Agent, or Firm*—Oliff & Berridge, PLC

(57) ABSTRACT

Method and apparatus for determining the ore content and for further treatment of the ore, the ore content of the crushed ore being monitored in the method on-line and the information on the ore content being utilized in the further treatment of the ore.

11 Claims, 1 Drawing Sheet

METHOD AND APPARATUS FOR ORE PROCESSING

Figure 1:
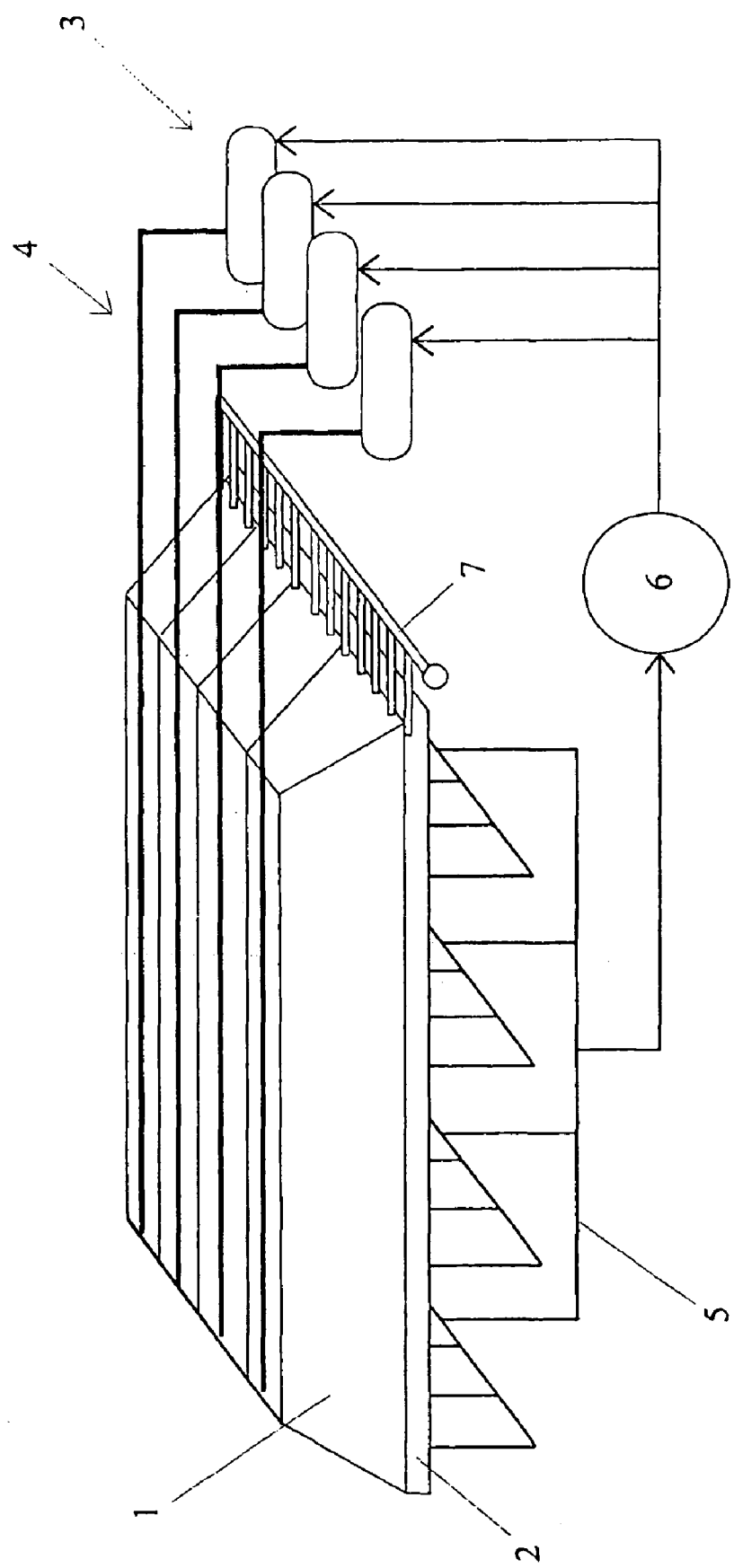

The present invention relates to ore processing like for example to the enrichment of ore, based on measuring of the ore content. More specifically, the invention relates to a method and an apparatus for on-line measuring of the ore content as well as to processing of the ore based on the measured ore content.

BACKGROUND OF THE INVENTION

The ore content of ore mined from an ore mine is usually defined by taking samples of the ore in the mine and by analyzing them in a laboratory. The analyzing of the samples usually takes a couple of days. Based on the received results, the mined ore is generally separated to waste rock and ore to be taken to further processing.

After that the ore to be taken to further processing will be crushed into grains of a desired size, that in some cases are further agglomerated to pellets of a desired size, for example in an agglomeration drum, whereby for example sulfuric acid is added to the ore in connection with the pellet production in order to intensify the further processing. After that, the agglomerated ore is taken to the further processing or storage.

One method for further processing of ore, known in the art, is heap leaching, whereby the crushed and agglomerated ore is stacked into a heap of a desired art and form, liquid dissolvent being sprayed evenly onto said heap, consisting for example of acid and microbes in a biological dissolution procedure. In the biological dissolution procedure, at first sulfur acid is sprayed onto the heap, corroding the ore pellets in a suitable way, after which the microbes to be sprayed onto the heap access the metals to be corroded out of the ore. These microbes dissolve the metal contained in the ore, said metal flowing along with the microbes in the solvent on the bottom of the heap. From the bottom of the heap the concentrated solvent is collected for further treatment of the metal. In general, the metal is removed from the concentrated solvent in a desired way, whereby the reclaimed solvent with its microbes can be reused as a solvent in the heap leaching process.

In the heap leaching process also air can be blown to the heap, if necessary, to intensify the action of the microbes and to accelerate the leaching process. In addition, also nutrients can be brought for the microbes. If necessary, the heap can also be covered for example for maintaining a suitable temperature in the heap for the leaching process.

Alternatively, the heap leaching process can also be implemented by using only acid as a solvent.

The ore content of the ore mined from an ore mine, however, varies very much, because the ore content of the mined ore is determined from a large amount of ore only with a couple of laboratory samples. Due to this big variation of ore content, it is difficult to manage the efficiency of the further processing of the ore, because in general the norms for the further processing are defined specifically according to the average ore content. For example in the above mentioned heap leaching process, this means that the same quantity of solvent is sprayed for each portion of the heap. Therefore in many portions of the heap, too much liquid dissolvent will be sprayed, whereas in some portions there is not enough liquid dissolvent with respect to the ore content.

GENERAL DESCRIPTION OF THE INVENTION

The aim of the present invention is to continuously monitor the ore content of the stored ore and to determine the location of the ore in question in the storage. Based on this information, the enrichment process can be controlled, for example by determining the correct amounts of solvent to be sprayed to each portion of the heap according to the ore content of each portion of the heap.

Alternatively, with the solution according to the invention, the ore can be sorted/guided to different destinations depending on its ore content. Thus, ore having desired ore contents can be guided to different destinations, whereby the ore to be guided to different destinations is homogenous within a predetermined range of the ore content. In that way the most profitable and efficient enrichment process can be chosen for each different range of the ore content.

With the solutions in accordance with the invention, different types of enrichment processes can be optimized depending on the ore content and the location of the ore, or alternatively, the right types of enrichment processes can be chosen for each different homogenized ore content, thus intensifying the enrichment process and the metal amount received from the ore.

More specifically, the method according to the present invention is characterized by what is stated in the characterizing part of Claim 1, and the apparatus according to the present invention is characterized by what is stated in the characterizing part of Claim 10.

DETAILED DESCRIPTION OF THE INVENTION

The invention will be described in more detail by way of example in the following, with reference to the enclosed drawing, wherein FIG. 1 is a schematic drawing of the heap leaching process.

In the heap leaching process shown in FIG. 1, ore is stacked onto a base 2 for example by means of a conveyor system (not shown) to form a heap. When building up the heap, the conveyor system travels along the front edge of the heap in the transversal direction feeding ore to form a heap of a desired height and width. Correspondingly, the heap is unloaded after the desired leaching time from the rear end of the heap, for example by means of a conveyor system (not shown) connected to a bucket loader, the desired leaching time being for example three years. The form of the heap as a top view can be preferably round or elliptical (f.ex. form of C), whereby the area required by the heap can be optimized and the heap loaded and unloaded according to this form.

The desired liquid dissolvent is sprayed from a tank 3 via pipe line 4. The solvent can be acid or microbes mixed to the liquid, or a mixture of those. In the solutions known in the art, the solvent is sprayed evenly to the heap with continuous feed during the whole leaching time.

After the liquid dissolvent has flown through the heap and dissolved the desired metal into itself, the enriched liquid is collected from the draining base 2 via receiving points connected to the receiving pipeline 5. The enriched liquid dissolvent is lead through the receiving pipeline 5 to the separation process 6, from where the recovered solvent is moved back to the tanks 3 for reutilization.

Also air can be blown to the heap through a pipeline 7, in order to intensify the leaching by the microbes. Correspondingly, through the pipeline 7 or alternatively also through the pipeline 4, also nutrients can be dispensed to the microbes, when necessary.

In a solution according to one embodiment of the invention, the conveyor system building up the heap 1 is equipped with a gauge of ore content of the ore to be fed, monitoring on-line the ore content of the ore to be fed. This kind of a gauge can be for example a sensor arrangement based on x-ray or laser technology. In this way the information on the ore content of the ore fed to the ore heap can be collected. In addition, the location of the conveyor system is monitored, for example by means of a solution based on a satellite positioning system, triangulation, base station positioning, coordinate positioning or another corresponding system, based on which the positioning information on the location of the ore in the heap can be defined in the plane coordinate system. Based on these two pieces of information, the ore content of the heap at each point of the heap can be defined. The location of the fed ore in vertical direction can also be determined, when necessary, by measuring the height of the heap to be built up, but it is not essential information in the heap leaching process, because the liquid dissolvent flows through the heap in the vertical direction of the heap.

Based on the information on the ore content in different points of the heap 1, a correct amount of liquid dissolvent can be supplied to each point of the heap with the necessary means through the pipeline 4.

Also the measurement of the ore content dissolved from the heap 1 can be included in the system, and based on that the spraying of the liquid dissolvent to the heap can be controlled as a function of the change of the ore content. The enriched liquid dissolvent diluted from the heap 1 is collected to the base 2, from where it is collected through the discharge openings and the receiving pipeline 5 to the separation process 6, where the metal diluted to the liquid dissolvent is separated from the liquid dissolvent. Because each of the discharge openings corresponds to a certain portion of the heap, by arranging in connection with each of the discharge openings the measuring of the metal content of the liquid dissolvent dissolved from the heap, the ore content dissolved from each portion of the heap can be detected. Based on that information, the quantity of the liquid dissolvent to be sprayed can be regulated to correspond to the remaining ore content in each portion of the heap.

In a solution according to another embodiment of the invention, the ore content of the ore received from the ore crushing and agglomeration process is monitored on-line, and the ore is separated to different destinations according to the desired ore contents. Thereby for example in the heap leaching, several different heaps can be formed depending on the ore content, and the spraying of the liquid dissolvent can be controlled to the whole heap according to the ore content data received from the classification of the ore. Thus, the pre-distribution of the ore acts as a kind of an ore homogenizer. By this kind of a solution also for example the heap leaching process can be intensified.

The solution in accordance with the invention is not limited to the measurement and enrichment of the ore content of metallic ores, but it can be applied to any ore type, for which the further treatment of the ore in question can be intensified by means of the on-line measurement information and positioning information or alternatively homogenizing.

The invention claimed is:

1. A method for determination of the ore content of ore and for further treatment of the ore, the method comprising:
    storing the ore in a heap; and
    applying a heap leaching process to form an enriched liquid; wherein
    ore content of the crushed ore to be fed to the heap is on-line monitored and is determined by means of an x-ray or laser measurement,
    a positioning information related to the ore content in the heap is determined, and
    spraying of a liquid dissolvent during the heap leaching process is controlled according to the ore content of the ore and the positioning information of the ore.

2. A method according to claim 1, wherein the content of a metal dissolved in the enriched liquid during the heap leaching process is measured, and based on the measuring information, the spraying of the liquid dissolvent is controlled.

3. A method according to claim 1, wherein the positioning information of the ore in the heap is determined based on the location of a conveyor.

4. A method according to claim 1, wherein the positioning information of the ore in the heap is determined based on satellite positioning, triangulation, base station positioning and/or coordinate positioning.

5. A method according to claim 2, wherein the positioning information of the ore in the heap is determined based on the location of a conveyor.

6. A method according to claim 2, wherein the positioning information of the ore in the heap is determined based on satellite positioning, triangulation, base station positioning and/or coordinate positioning.

7. A method according to claim 3, wherein the positioning information of the ore in the heap is determined based on satellite positioning, triangulation, base station positioning and/or coordinate positioning.

8. An apparatus for determining the ore content of ore and for further treatment of ore, the apparatus comprising means for feeding the ore to a heap, at least one x-ray or laser sensor for on-line determination of the ore content of the ore, means for spraying a dissolving agent to the surface of the heap, means for determining the positioning information in the heap related with the ore content of the ore, and means for determining the adequate amount of dissolving agent for each portion of the heap based on the ore content.

9. An apparatus according to claim 8, wherein the apparatus comprises means for determining the metal content of a dissolving liquid dissolved from each portion of the heap.

10. An apparatus according to claim 8, wherein the means for determining the positioning information related to the ore content of the ore in the heap comprises satellite positioning means, triangular positioning means, base station positioning means and/or coordination positioning means.

11. An apparatus according to claim 9, wherein the means for determining the positioning information related to the ore content of the ore in the heap comprises satellite positioning means, triangular positioning means, base station positioning means and/or coordination positioning means.

* * * * *